Sept. 11, 1951 J. M. DAVIES 2,567,804
MEANS FOR PREVENTING THE ACCUMULATION OF
ICE ON AIRCRAFT SURFACES AND THE LIKE
Filed Dec. 3, 1945
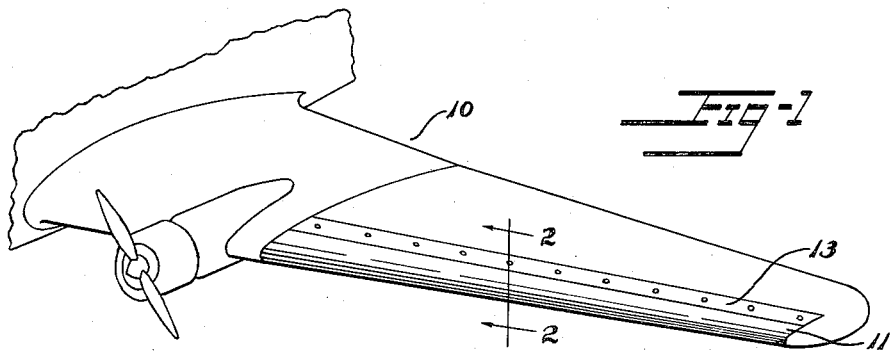
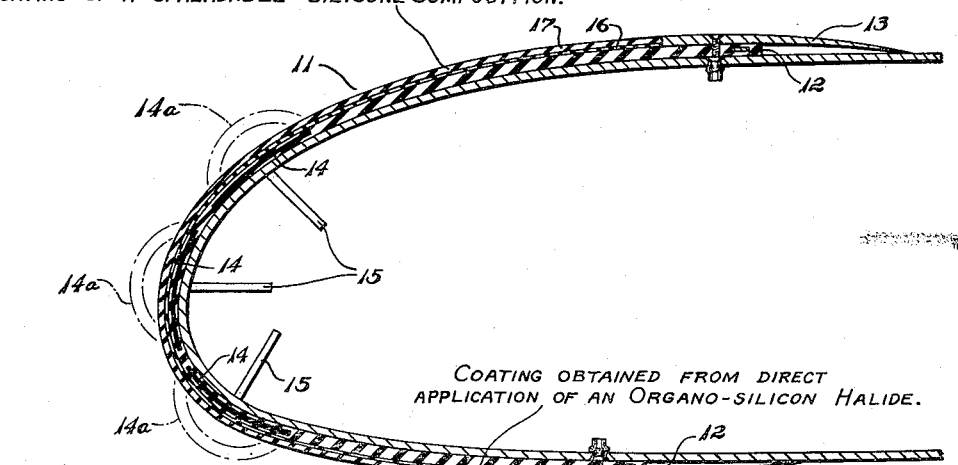
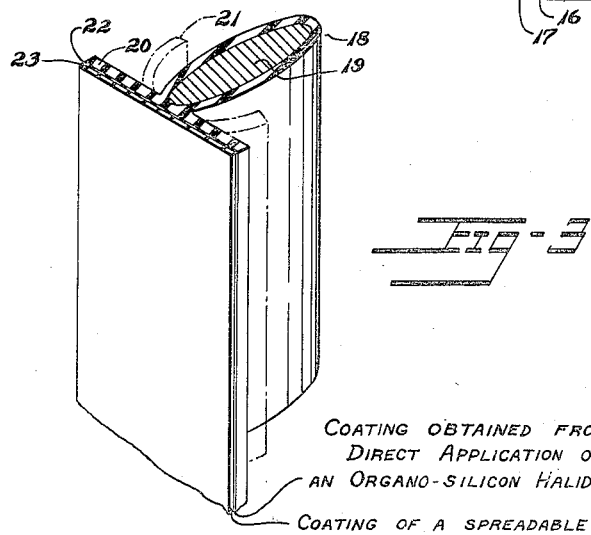

Patented Sept. 11, 1951

2,567,804

UNITED STATES PATENT OFFICE 2,567,804

MEANS FOR PREVENTING THE ACCUMULATION OF ICE ON AIRCRAFT SURFACES AND THE LIKE

John M. Davies, Akron, Ohio, assignor to The B. F. Goodrich Company, New York, N. Y., a corporation of New York Application December 3, 1945, Serial No. 632,416

8 Claims. (Cl. 244—134)

This invention relates to means for preventing the accumulation of ice on aircraft surfaces and other surfaces exposed to icing conditions.

Ice-formation on the leading edges of aircraft wings, struts, propellers and the like is a serious hazard particularly in winter flying and in flying at high altitudes. The most successful means of combatting this hazard is known commercially under the trade-mark "De-Icer." The "De-Icer" in its common form comprises a boot or covering for the leading aircraft edge and includes a flexible element such as a sheath or covering of elastic material over a number of inflatable tubes. Ice-removal is effected by periodically inflating alternate sets of the tubes so as to impart a shifting, stretching, and undulating movement to the rubber sheath whereby the ice is broken sufficiently for the air stream to lift it from the surface. Under extreme icing conditions sometimes encountered, the ice adheres so tenaciously to the sheath that, even though it is broken by the undulating movement of the sheath, the air stream cannot completely remove it from the surface. In addition there are certain aircraft surfaces, such as propeller surfaces, which are not ordinarily susceptible to the application of such inflatable ice-removal apparatus, yet must be provided with some means of preventing the accumulation of ice thereon.

I have discovered a means of preventing the accumulation of ice on aircraft surfaces as well as other surfaces exposed to icing conditions and especially for increasing the effectiveness of the flexible ice-removal apparatus described above. I have found that the adhesion of ice to an aircraft surface or other surface exposed to icing conditions is greatly reduced by treating the surface with a double surface treatment comprising a foundation film derived by directly treating the surface with an organo-silicon halide, and a superposed film or layer of a pre-polymerized silicon composition having a viscous oily or "greasy" consistency such as may be spread in a film by a simple flowing or hand "smearing" operation. Extensive tests show that it is possible thereby to reduce the adhesion of ice to a rubbery surface, such as the surface of a "De-Icer" by as much as 96% or more with the result that ice-removal by the air stream is greatly facilitated. Furthermore, I have discovered that the above-described treatment is exceedingly durable; its effectiveness is not appreciably impaired by the repeated accumulation and removal of ice from the treated surface nor by the abrasive action of air-suspended particles of dust, water and the like driven against the surface at high speed, nor by the destructive chemical action of sunlight and ozone. Furthermore, the surface treatment does not damage an ice-removal apparatus of rubbery material but to the contrary since the silicone materials are extremely resistant to sunlight and ozone the treatment tends to extend the life of the apparatus.

The organo-silicon halides employed in the practice of the invention polymerize to form rubber-like substances known as silicones by processes understood to involve hydrolysis of the halide followed by polymerization of the resulting silanol (or silicol). It it also understood that when objects such as fabrics, rubber-like surfaces and the like are contacted by the liquid halide or the halide vapor, moisture on the surface ordinarily will be sufficient to hydrolyze the halide and form a thin, closely adherent film of the silicone polymer over the treated surface, although, as a precautionary measure, the surface may be humidified before treatment. The film so produced is flexible and elastic and hence is especially adapted to be applied to the surface of rubber-like material such as the flexible sheath of the ice-removal apparatus of this invention.

Among the organo-silicon halides useful in the invention are the alkyl-silicon halides, the aryl-silicon halides, the alkyl-aryl, the aryl-alkyl silicon halides and silicon halides having both aryl and alkyl groups attached to the silicon atom, including but not being limited to the following illustrative materials: dimethyl silicon dichloride, diethyl silicon dichloride, dipropyl silicon dichloride, methyl silicon trichloride, methylethyl silicon dichloride, dimethyl silicon dibromide, dilauryl silicon dichloride, diphenyl silicon dichloride, dibenzyl silicon dichloride, dichlorophenyl silicon dichloride, ethyl silicon tribromide, methyl silicon tribromide, methyl phenyl silicon dibromide, and others such as are described in the literature, as well as mixtures of any of the above compounds with the same or with other organo-silicon halides.

The silicones or silicone materials which are preferably employed for the outer coating are those pre-polymerized polymers of the oily or greasy types that have a relatively high viscosity or those pre-polymerized polymers of the solid types that will form a solution of relatively high viscosity in a volatile solvent and which will form a coating sticky enough to adhere tenaciously to a surface to which it is applied. The silicones which have been found most satisfactory are marketed by the Dow-Corning Corporation in the form of viscous and syrupy liquids of a viscosity between 40,000 and 100,000 centistokes. These silicones may be diluted with gasoline, hexane and the like and applied to the surface in solution form. Such solution upon drying forms a tough film which remains soft and tacky for long periods of time. It will be understood, however, that other known silicone materials having generally similar properties may be used and will be found to effectively reduce the adhesion of ice to rubbery surfaces and similar surfaces exposed to icing conditions.

Silicones and silicon halides utilized in the invention may be obtained from the Dow-Corning Corporation and from the General Electric Company. General information concerning these materials may be found in patents and periodicals, some of which are the Corning Glass Works British Patent No. 561,136; "Chemical and Metallurgical Engineering" for August, 1944, at pages 109, 135 and 136; "General Electric Review" for August, 1944; "Modern Plastics" for November, 1944, in the article beginning at page 124 entitled "Silicones—High Polymeric Substances"; and "Chemical and Engineering News" for November 25, 1944, at page 2016.

The silicones may be obtained in a variety of forms varying from oil-like liquids of varying viscosities, greases, and solids varying from soft elastomers to resin-like materials. The elastic solid silicones may be compounded and cured by effecting crossbonding to obtain a product resembling vulcanized rubber in many respects. The oil-like, grease-like and solid silicones may contain catalysts and compounding ingredients and may be reduced to a spreadable composition with solvents and/or plasticizers and used in the practice of this invention. Furthermore the silicone coating may comprise a mixture of one or more silicone polymers.

The organo-silicon halides or silanes, as they are often termed, are preferably applied by exposing the surface to be treated to the silane vapors, or the silanes may be applied by brushing or spraying the liquid silane or a solution of the silane in a volatile solvent on the surface to be treated.

The pre-polymerized silicones are preferably applied by brushing or spreading viscous solutions of the polymers in volatile solvents. The silicones may also be applied by brushing or spraying solutions of the silicones on the surface exposed to icing conditions or even by simply hand "smearing" a "greasy" silicone over the surface.

The solvents which may be used in the preparation of the sticky viscous solutions of pre-polymerized silicones and also in preparing solutions of the organo-silicon halides are hexane, benzene, gasoline, carbon tetrachloride and similar hydrocarbon and halogen-substituted hydrocarbon solvents. It is also desirable in many cases to form sticky and viscous as well as slow drying solutions of the solid silicones by using one of the light silicone oils as a solvent.

In an illustrative example, an ice-removing apparatus of the type known as a "De-Icer" made principally of natural rubber and surfaced with neoprene cements was first humidified by exposure to damp air and exposed to the vapors of dimethyl silicon dichloride. The treated surface was then covered with a coating of a syrupy 50% solution in hexane of the heavy greasy rubber-like silicone polymer known as "Elastomer." An ice adhesion test (a test involving a combination of shear and vertical forces to lift a button of ice from a test strip) revealed the adhesion of ice to the treated rubbery material to be 1.3 pounds per square inch. A control test (a sample without treatment) exhibited ice adhesion of 39 pounds per square inch. Thus it is seen that the adhesion of ice to the rubbery surface was reduced 96.5% by the double surface treatment of this invention.

In a variation of the above example the organo-silicon halide was applied by preparing a 50% solution of dimethyl silicon dichloride in benzene and the solution applied to the De-Icer by brushing or spraying and the solvent and evolved hydrochloric acid allowed to evaporate. In other cases, the pure liquid silicon halide has been brushed and sprayed on the surface. Likewise, a greasy or oil-like silicone has been substituted for the gasoline solution of the silicon polymer with satisfactory results, and in fact the undiluted "Elastomer" may so be applied by a hand spreading operation.

It was also found helpful in some cases to dissolve relatively viscous silicone materials in the more fluid silicone "oils" in order to form solutions of relatively low viscosity, which are desirable for ease of application, and to form solutions which do not dry too rapidly and which do not evolve noxious odors of the ordinary volatile solvents. As an example of a solution for use as the second or outer coating on the flexible element of a "De-Icer," a 30% solution of a heavy, syrupy silicone material, having a viscosity varying from 40,000 to 100,000 centistokes, in a light fluid silicone "oil," having a viscosity of about 0.65 centistoke was "smeared" over a film derived from dimethyl silicon dichloride and found to materially decrease the adhesion of ice to the flexible element. Similar combinations of other relatively viscous and relatively non-viscous silicone polymers are likewise useful.

In order to demonstrate the durability of the adhesion-reducing surface treatments of the invention, a series of samples were prepared and tested by exposing the treated surfaces to the action of a powerful ultra-violet light (and ozone generated by the light) and in a second test to the action of a fine spray of water driven against the surface by compressed air. After exposure to the ultraviolet light or the water spray, the above-described adhesion test was run on the samples and the results compared to a control sample. The samples tested were: (1) a sample given only a coating derived from dimethyl silicon dichloride vapors; (2) a sample given only a coating of the "Elastomer" solution; (3) a sample given both the dimethyl silicon dichloride vapor treatment and the "Elastomer" solution coating in accordance with the present invention; and (4) a control sample with no surface treatment.

The preferred surface treatment which was applied to sample 3 above, proved to be more efficient initially than any of the treatments given the other samples. After long exposure to a powerful ultraviolet light comparison of the adhesion of ice to the samples revealed that: the adhesion of ice to sample 1 increased to 95% of its adhesion to the original control after 48 hours exposure; to sample 2, 43.6% in 48 hours; and sample 3 only 23.4% after 48 hours exposure indicating the outstanding durability of the combined treatments of the present invention.

After exposure to ultraviolet light for 120 hours, continued exposure to the light failed to appreciably increase the affinity of ice to sample 3 while both of the other two treatments continued to deteriorate at substantially the same rate with further exposure.

Results of the spray test (abrasion) were even more impressive. The affinity of ice for sample 1 increased to 92.5% of the original control in 1 hour; the affinity of ice for sample 2 was 48% of the control after 48 hours; but after 48 hours the affinity of ice for sample 3 did not increase substantially beyond a value of 24% of its affinity for the original control. The ultraviolet light and water spray tests represent an accelerated approximation of long periods of exposure under actual service conditions. It has been found that after long periods of exposure to icing conditions in service the surface treatment of this invention wears down to a thin elastic coating which loses little of its effectiveness with continued exposure to icing conditions.

As a second illustrative example, the combined treatment of this invention may be applied to the surface of an aircraft propeller for reducing the adhesion of ice thereto. In order to firmly adhere the two coatings to the metal surface the propeller surface desirably should be first coated with a lacquer of the type which will adhere to the metal of the propeller after which a coating of an ordinary vulcanizable rubber cement is applied over the lacquered surface. The prepared propeller is first humidified and then exposed to the vapors of an organo-silicon halide such as dimethyl silicon dichloride after which it is treated with a 25% solution in hexane of a thick viscous silicone polymer. The propeller thus is provided with a surface to which ice adheres so poorly that the force of the airstream and the centrifugal force of the rotating propeller are sufficient to throw or slide ice from the surface.

The invention will now be described with further particularity in connection with typical applications of ice-removing apparatus having the combined treatment of this invention.

Of the drawings:

Fig. 1 is a conventionalized perspective view of an aircraft wing fitted with ice-removing apparatus provided with a surface adapted to facilitate the removal of ice therefrom in accordance with the invention.

Fig. 2 is a sectional view taken along the line 2—2 of Fig. 1 and showing more specifically the details of the inflatable ice-removing apparatus as mounted upon an aircraft wing.

Fig. 3 is a perspective view in section of a second type of ice-removing apparatus adapted for use on an aircraft strut or similar structure and having the combined surface treatment of this invention for reducing the adherence of ice thereto.

Referring to Figs. 1 and 2 of the drawings, the numeral 10 designates a conventional aircraft wing having an inflatable boot 11 of the "De-Icer" type mounted over the leading edge thereof. The boot is shown in Figs. 1 and 2 in simplified and conventionalized style for reasons of clarity and consists of a rubbery skin or sheath-like element 12 mounted in a stretched condition over the leading edge of the wing 10 with the edges of the sheath being received by fairing strips 13, 13 which are usually riveted or otherwise secured to the skin surface of the wing itself. Beneath the sheath 12 are provided three parallel inflatable tubes 14, 14 extending spanwise and being disposed about the leading edge of the wing 10 in the manner known to the art. The tubes are shown in dotted lines at 14a, 14a as they appear when inflated. The inflatable tubes 14, 14 are connected by means of communicating hose 15, 15 to an inflating means (not shown) normally adapted to supply compressed air or other inflating fluid in such a manner as to inflate the center inflatable tube and the outside pair of tubes in alternating sequence.

In accordance with the invention, the exposed face of the elastic skin or sheath element 12 is provided with two surface layers or coatings, the first layer 16 adjacent the elastic layer consisting of a thin adherent flexible silicone film coating produced by direct application of an organo-silicon halide thereto as indicated by the legend, the layer 16 being shown in greatly exaggerated thickness for reasons of clarity. The second layer 17, as indicated by the legend, consists of a superposed coating of a spreadable silicone polymer or composition thereof applied in the form of a viscous solution or in the form of a liquid-like, wax-like, or paste-like polymer composition in any of the manners described, the second silicone coating also being shown in greatly exaggerated thickness for clarity of illustration. The two coatings form a unitary surface layer exceedingly effective in reducing the adhesion of ice to the surface of the sheath. The inflatable boot described above may be made of natural rubber, neoprene, butadiene-styrene polymers, plasticized polyvinyl chloride, or other synthetic rubbery material, and may include any of the usual compounding ingredients as well as fabric or other reinforcing materials according to the usual practice.

Fig. 3 shows another form of flexible ice-removal apparatus especially adapted for use on airplane struts, wires and the like. This device may be made of rubber or rubberized fabric and comprises a sheath 18 which surrounds the strut or wire 19 in such a manner as to support or anchor the flat sheet-like element 20 on the leading edge of the strut or wire. In flight the sheet element 20 will be flexed and bent to varying degrees as the speed of the airplane varies until the sheet 20 assumes a shape such as that shown in dotted lines at 21. The sheet element 20 may be provided as indicated by the legends with a thin flexible coating 22 produced by exposure of the surface to an organo-silicon halide and a superposed coating 23 of a spreadable silicone polymer.

The invention has been described with particular reference to ice-removal apparatus for aircraft but is also applicable to other types of articles exposed to icing conditions during service such as flexible hose (fire-hose), electrical cables, radio antennae, ship's rigging and the like. In fact, the present invention may be applied with advantage to any surface exposed to icing conditions which will be swayed, shaken, flexed, bent or moved in any way, or have other means of mechanically removing the ice therefrom such as a violent current of air blowing across the surface exposed to icing condition. In addition the invention may be applied to surfaces exposed to icing conditions which may have the accumulated ice manually removed by scraping or chipping. Examples of the latter use are railings, stairways, fire escapes, ship decks, etc. Other modifications and variations may be effected without departing from the spirit and scope of the invention as defined by the appended claims.

I claim:
1. Ice-combatting means resistant to the adhesion of ice under icing conditions comprising a flexible elastic element of rubbery material having on an exposed surface thereof a foundation film derived from an organo-silicon halide, and a layer comprising silicone polymer derived from a liquid polymeric silicone composition superposed on said treated surface adherent thereto and resistant to the adhesion of ice under said icing conditions.

2. Ice-combatting means resistant to the adresion of ice under icing conditions comprising a flexible elastic element of rubbery material having an exposed surface comprising polymeric material derived from an organo-silicon halide, and adhered thereto an overlying extensible and elastic film derived from a liquid polymeric silicone and resistant to the adhesion of ice under said icing conditions.

3. Ice-combatting means resistant to the adhesion of ice under icing conditions comprising a flexible elastic element of rubbery material having on an exposed surface thereof a foundation film of polymeric silicone derived from the vapors of an organo-silicon chloride and an overlying extensible and elastic film adherent thereto derived from a viscous liquid silicone polymer and resistant to the adhesion of ice under said icing conditions.

4. The method of reducing the adhesion of ice to the surface of a rubbery material normally subjected to icing conditions which comprises applying to said surface a foundation film derived from an organo-silicon halide, and applying thereover a coating comprising a liquid polymeric silicone composition resistant to the adhesion of ice under said icing conditions.

5. The method of reducing the adhesion of ice to the surface of a rubbery material normally subjected to icing conditions which comprises applying to said surface a foundation film of polymeric material derived from an organo-silicon chloride, and applying thereover a coating comprising a liquid polymeric silicone resistant to the adhesion of ice under said icing conditions.

6. The method of reducing the adhesion of ice to the surface of a rubbery material normally subjected to icing conditions which comprises coating said surface with an organo-silicon chloride to form a polymeric material at said surface, and subsequently spreading thereon a film comprising viscous liquid polymeric silicone resistant to the adhesion of ice under said icing conditions.

7. The method of reducing the adhesion of ice to the surface of a rubbery material normally subjected to icing conditions which comprises treating said surface with the vapors of an organo-silicon halide to form a polymeric material at said surface, and subsequently covering said treated surface with a layer of viscous liquid polymeric silicone, providing thereby a resulting extensible elastic film adherent to said surface stretchable with the rubbery material and resistant to the adhesion of ice under said icing conditions.

8. The method of reducing the adhesion of ice to the surface of a rubbery material normally subjected to icing conditions which comprises applying to said surface the vapors of an organo-silicon chloride to form thereon a thin, tightly adherent foundation film of polymeric silicone material, and subsequently spreading over said treated surface a thin layer of viscous material comprising a solution in a volatile solvent of a solid polymeric silicone, providing thereby a resulting extensible elastic film adhered to said surface stretchable with the rubbery material and resistant to the adhesion of ice under said icing conditions.

JOHN M. DAVIES.

REFERENCES CITED

The following references are of record in the file of this patent:

UNITED STATES PATENTS

| Number | Name | Date |
|---|---|---|
| 1,890,286 | Geer | Dec. 6, 1932 |
| 1,993,809 | Geer | Apr. 23, 1935 |
| 2,258,218 | Rochow | Oct. 7, 1941 |
| 2,258,219 | Rochow | Oct. 7, 1941 |
| 2,306,222 | Patnode | Dec. 22, 1942 |
| 2,390,370 | Hyde | Dec. 4, 1945 |
| 2,392,805 | Biefeld | Jan. 15, 1946 |
| 2,436,304 | Johannson | Feb. 17, 1948 |
| 2,439,689 | Hyde | Apr. 13, 1948 |
| 2,441,098 | Hyde | May 4, 1948 |
| 2,471,224 | Loughborough | May 24, 1949 |

OTHER REFERENCES

Rubber Chem. and Tech., vol. 12 (1939), pp. 901 and 902.